(12) United States Patent
Lazaridis (10) Patent No.: US 8,957,869 B2
(45) Date of Patent: Feb. 17, 2015

(54) ELECTRONIC DEVICE AND METHOD FOR DYNAMICALLY FORMATTING MONETARY EXPRESSIONS

(75) Inventor: Mihal Lazaridis, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 25 days.

(21) Appl. No.: 13/444,612

(22) Filed: Apr. 11, 2012

(65) Prior Publication Data

US 2013/0271381 A1  Oct. 17, 2013

(51) Int. Cl.
G06F 3/041 (2006.01)
G06F 3/02 (2006.01)
G06Q 40/00 (2012.01)
H04M 1/00 (2006.01)

(52) U.S. Cl.
USPC ........... 345/173; 345/168; 345/169; 345/171; 455/556.2; 705/35

(58) Field of Classification Search
CPC ....... G06F 17/277; G06F 7/08; G06F 3/0237; G06F 3/027; G06Q 20/32
USPC ........................ 345/156, 168–169, 171–173; 455/556.1–556.2; 705/35
See application file for complete search history.

(56) References Cited

U.S. PATENT DOCUMENTS

| 6,438,545 | B1 | 8/2002 | Beauregard et al. | |
| 6,721,715 | B2 | 4/2004 | Nemzow | |
| 6,928,438 | B2 | 8/2005 | Daray et al. | |
| 6,957,385 | B2 | 10/2005 | Chan et al. | |
| 7,137,070 | B2 | 11/2006 | Brown et al. | |
| 7,380,203 | B2 | 5/2008 | Keely et al. | |
| 7,590,575 | B2 | 9/2009 | Yu et al. | |
| 7,610,548 | B1 | 10/2009 | Brinkman et al. | |
| 7,707,024 | B2 | 4/2010 | Arayasantiparb et al. | |
| 7,825,900 | B2 | 11/2010 | Griffin et al. | |
| 7,853,276 | B2 * | 12/2010 | Charland | 455/466 |
| 8,049,677 | B2 | 11/2011 | Lum et al. | |
| 2002/0184308 | A1 | 12/2002 | Levy et al. | |
| 2005/0248527 | A1 * | 11/2005 | Scott | 345/156 |
| 2006/0005127 | A1 | 1/2006 | Ferguson et al. | |
| 2007/0236461 | A1 | 10/2007 | Griffin | |
| 2008/0115054 | A1 * | 5/2008 | Scott | 715/255 |
| 2008/0305815 | A1 | 12/2008 | McDonough | |
| 2010/0169397 | A1 * | 7/2010 | Choi et al. | 708/206 |
| 2012/0032885 | A1 * | 2/2012 | Miller | 345/168 |

FOREIGN PATENT DOCUMENTS

| EP | 1494438 | 1/2005 |
| WO | 2007008805 | 1/2007 |
| WO | 2008044134 | 4/2008 |

OTHER PUBLICATIONS

PCT Notification of Transmittal of the International Search Report and the Written Opinion of the International Searching Authority for International Application No. PCT/CA2012/000358, mailed Jan. 8, 2013, 8 pages.

European Patent Office, Communication pursuant to Article 94(3) EPC, for European Application No. 12163781.3, mailed Feb. 4, 2013, 4 pages.

(Continued)

*Primary Examiner* — Lun-Yi Lao
*Assistant Examiner* — Jarurat Suteerawongsa
(74) *Attorney, Agent, or Firm* — Fish & Richardson P.C.

(57) ABSTRACT

An electronic device is provided, having a processor configured to automatically format monetary expressions.

20 Claims, 4 Drawing Sheets

(56) References Cited

OTHER PUBLICATIONS

Communication from the European Patent Office enclosing the Extended European Search Report for European Application No. 12163781.3, dated Jul. 23, 2012 (7 pages).

German Office Action, dated Jul. 16, 2014, issued in German Application No. 204242PCDE (4 pages).

Kubota, Tomohiro, Introduction to i18n (2008), http://www.informatus.fr/Documentations/Debian/debian$_{13}$ intro$_{13}$ i18n.pdf.

* cited by examiner

ELECTRONIC DEVICE AND METHOD FOR DYNAMICALLY FORMATTING MONETARY EXPRESSIONS

FIELD OF TECHNOLOGY

The present disclosure relates to electronic devices including, but not limited to, portable electronic devices and their control.

BACKGROUND

Electronic devices, including portable electronic devices, have gained widespread use and may provide a variety of functions including, for example, telephony, text messaging, web browsing, or other personal information manager (PIM) functions such as a calendar application. Portable electronic devices include several types of devices such as cellular telephones (mobile phones), smart telephones (smart phones), Personal Digital Assistants (PDAs), tablet computers, or laptop computers, with wireless network communications or near-field communications connectivity such as Bluetooth® capabilities.

Portable electronic devices such as smart phones, tablet computers, or PDAs are generally intended for handheld use due to their small size and ease of portability. A touch-sensitive input device, such as a touchscreen display, is desirable on handheld devices, which are small and may have limited space for user input or output devices. Improvements in electronic devices with displays are desirable.

BRIEF DESCRIPTION OF THE DRAWINGS

Embodiments of the present disclosure will now be described, by way of example only, with reference to the attached Figures, wherein.

DETAILED DESCRIPTION

The present disclosure describes a device having a keyboard and a processor, and a method performed on the device, the method comprising receiving an input, determining a currency format associated with the device based on a locale associated with the device, and upon determining from input reflects completion of a monetary expression, automatically formatting the monetary expression for output according to the determined currency format.

For simplicity and clarity of illustration, reference numerals may be repeated among the figures to indicate corresponding or analogous elements. Numerous details are set forth to provide an understanding of the example embodiments described herein. The example embodiments may be practiced without these details. In other instances, well-known methods, procedures, and components have not been described in detail to avoid obscuring the example embodiments described herein. The description is not to be considered as limited to the scope of the example embodiments described herein.

The present disclosure generally relates to an electronic device, such as a portable electronic device. Examples of portable electronic devices include wireless communication devices such as cellular telephones (mobile phones), smart telephones (smart phones), pagers, PDAs, tablet computers, laptop computers, notebook computers, netbook computers, and so forth, with wireless communications capabilities. The portable electronic device may also be a portable electronic device without wireless communications capabilities. Examples include handheld electronic game devices, digital photograph albums, digital cameras, gaming consoles, or similar devices.

Users of portable electronic devices often include monetary expressions (i.e., textual or formulaic representations of monetary amounts) in their communications. The proper format for the monetary expression varies among the different countries, different currencies, and even the specific symbols used for a given currency. Properly formatting the monetary expression means putting the currency symbol on the correct side of the number representing the amount, putting the correct number of spaces between them (typically, one space or no space), including the thousand separator, a decimal point, the cent amount, etc. The user may be unaware of the correct format to use in every circumstance, may accidentally use an incorrect format, or deliberately forgo properly formatting the monetary expressions in the interest of time. Embodiments consistent with the present disclosure seek to assist the user by detecting a monetary expression as it is being entered by the user and automatically, in real time, formatting the monetary expression according to the correct format, as determined, for example, by the user's locale and the currency symbol used. Additionally, embodiments seek to further assist the user by automatically displaying, on a virtual touch-sensitive keyboard, a currency symbol that corresponds to the user's locale.

Figure 1:
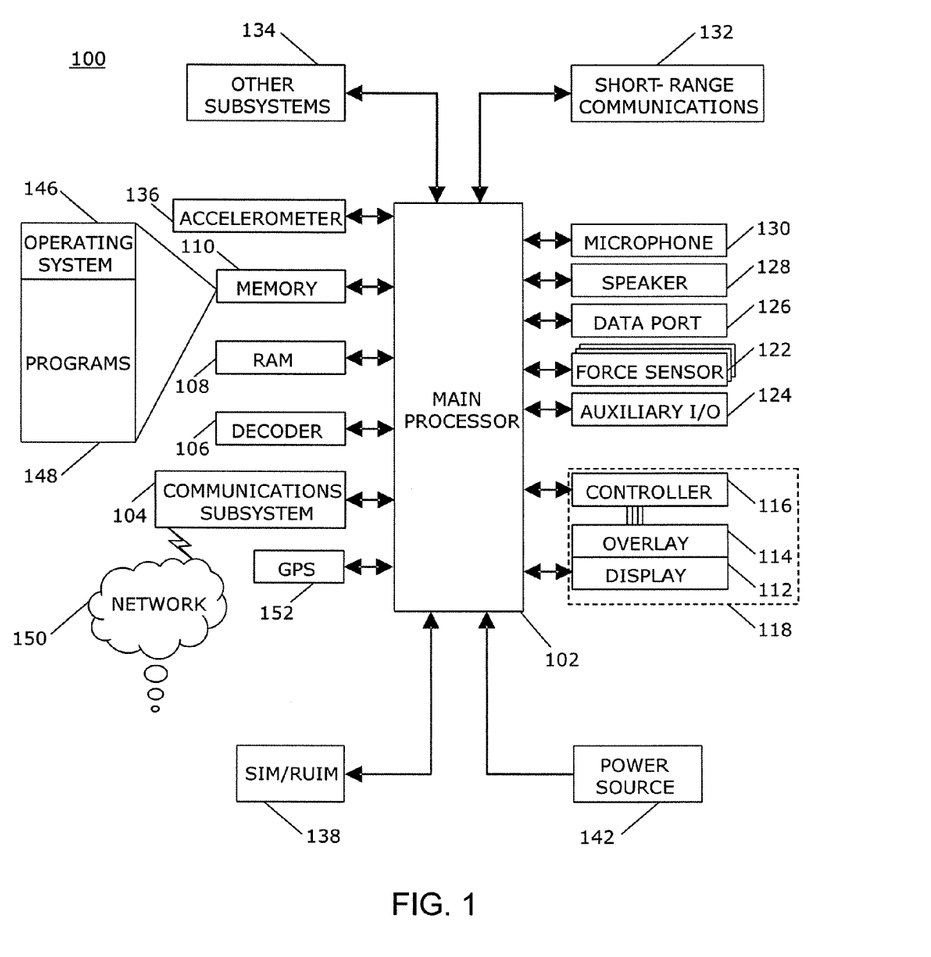
FIG. 1 is a block diagram of an example of a portable electronic device in accordance with the present disclosure.

A block diagram of an example of a portable electronic device 100 is shown in FIG. 1. The portable electronic device 100 includes multiple components, such as a processor 102 that controls the overall operation of the portable electronic device 100. The portable electronic device 100 presently described optionally includes a communications subsystem 104 and a short-range communications 132 module to perform various communication functions, including data and voice communications. Data received by the portable electronic device 100 is decompressed and decrypted by a decoder 106. The communications subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 is coupled to and interacts with other components, such as Random Access Memory (RAM) 108, memory 110, a display 112. In the example embodiment of FIG. 1, the display 112 is coupled to a touch-sensitive overlay 114 and an electronic controller 116 that together comprise a touch-sensitive display 118. The processor is also coupled to one or more actuators 120, one or more force sensors 122, an auxiliary input/output (I/O) subsystem 124, a data port 126, a speaker 128, a microphone 130, short-range communications 132, and other device subsystems 134. User-interaction with a graphical user interface (GUI) is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may interact with an orientation sensor such as an accelerometer 136 to detect direction of gravitational forces or gravity-induced reaction forces so as to determine, for example, the orientation of the portable electronic device 100. The processor 102 may interact with a GPS module 152 in order to determine the geographical location of the portable electronic device 100.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal, such as a text message, an e-mail message, or web page download, is processed by the communications subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communications subsystem 104, for example.

Figure 2A:
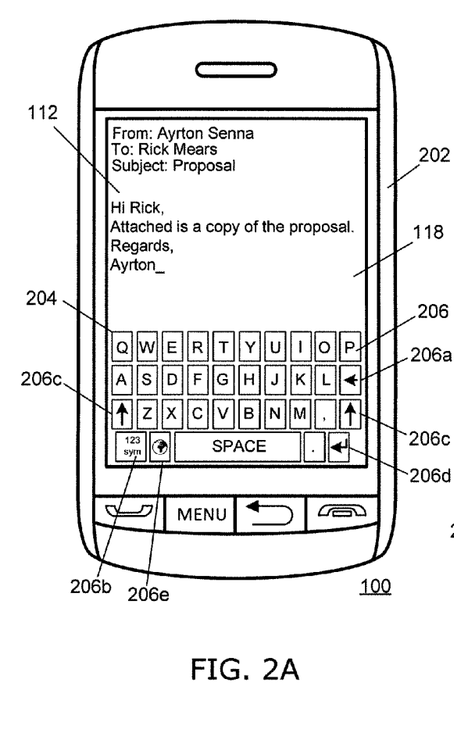
FIGS. 2A and 2B are front views of an example of a portable electronic device having a virtual keyboard rendered on the display of the portable electronic device in accordance with the present disclosure.

A front view of an example of the portable electronic device 100 is shown in FIG. 2A. The portable electronic device 100 includes a housing 202 in which the touch-sensitive display 118 is disposed. The housing 202 is an enclosure that contains components of the portable electronic device 100, such as the components shown in FIG. 1.

A keyboard 204 may be a physical keyboard within the housing 202, or a virtual keyboard rendered as a GUI displayed on the touch-sensitive display 118 as illustrated by the example embodiment of FIG. 2A. As shown in FIG. 2A, the keyboard 204 is a GUI rendered on the touch-sensitive display 118 and has a QWERTY keyboard layout. In alternate example embodiments, other keyboard layouts such as QWERTZ, AZERTY, Dvorak, or the like, may be utilized. Similarly, reduced keyboards having two or more characters associated with certain keys, such as a reduced QWERTY keyboard layout, can be contemplated. For example, a reduced QWERTY keyboard may be provided in which the letters Q and W share a single key, the letters E and R share a single key, and so forth.

The keyboard 204 may be rendered in any suitable program or application such as a web browser, text messaging (such as an email client), contacts, calendar, music player, spreadsheet, word processing, operating system interface, and so forth for text input. Other information such as text, characters, symbols, images, and other items may also be displayed, for example, as the keyboard 204 is utilized for data entry. The keyboard 204 includes a plurality of keys 206, each key associated with at least a character or a function as indicated by indicia displayed thereupon.

In the example illustrated in FIG. 2A, the keys 206 are associated with the letters of the alphabet, punctuation marks, and special functions including a backspace key 206a, alt key 206b, shift keys 206c, return key 206d, and globe key 206e. Pressing the alt key 206b causes some or all of the keys 206 to become associated with alternate characters or functions. In the example illustrated in FIG. 2B, such alternate characters, as indicated by the alternate indicia displayed thereupon, include numbers, additional punctuation marks, special characters such as "@", "#", "*", and a currency key 206i. Pressing the alt key 206b once again re-associates the keys with the original characters illustrated in FIG. 2A.

The keyboard 204 that is rendered on the touch-sensitive display 118 is associated with a keyboard language that is set at the portable electronic device 100 and may be, for example, an English keyboard, a French Keyboard, a Spanish Keyboard, an Arabic Keyboard, a Hebrew keyboard, or a keyboard 204 in any other language available by the portable electronic device 100. Keyboards of different languages are accessible by selecting the globe key 206e. Upon receiving a touch at a location on the touch-sensitive display 118 associated with the globe key 206e, a list of keyboards available in alternate languages is provided. In some embodiments, for example, the globe key 206e displays an abbreviation indicator (for example, indicia such as EN for an English keyboard, FR for a French keyboard, or ES for a Spanish keyboard, etc.) to indicate the language of the keyboard 206 currently being rendered.

Figure 2B:
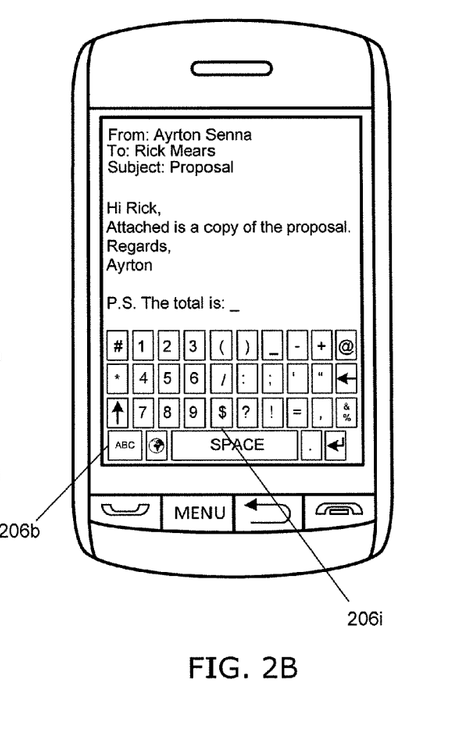

In one embodiment, the currency key 206i is associated with a currency symbol that corresponds to a current locale associated with the device, and can be dynamically re-associated with a different currency symbol when the locale for the device changes. As discussed below, the current locale is determined by the processor 102 based on one or more factors.

In some example embodiments, the locale will be determined based on the current keyboard language. For example, when a German keyboard is selected, the processor 102 determines that the locale is Germany, automatically associates the currency key 206i with a euro symbol "€" and displays the symbol upon the currency key 206i. Similarly, currency symbols "¥" and "₪" become associated with the currency key 206i when Japanese and Hebrew keyboards are selected, respectively. Most currencies can be represented by more several different symbols, and some symbols consist of more than one character. For example, the Japanese yen can be represented by symbols: "¥", "円" or "JPY". Likewise, the Canadian dollar can be represented by either the symbol "$", by a combination of symbol and characters such as "C$", "CAN$", or by characters "CDN" or "CAND" only.

When there are several possible symbols for a given currency, the processor 102 selects a default symbol. In addition, a user can select the desired symbol dynamically by, for example, repetitively touching the currency key 206i, with each touch causing the currency key 206i to become associated with the next possible symbol. Dynamic selection can also be achieved by pressing the currency key 206i for a predefined period of time, thereby causing a list of all possible symbols to appear on the touch-sensitive display 118 (for example in a pop-up menu displayed proximate to the currency key 206i), and then selecting the desired currency symbol.

In other example embodiments, the locale is determined by the processor 102 based on the geographical location of the device 100. The geographical location may be determined, for example, by utilizing the GPS module 152, by applying a cellular triangulation technique, or by checking the current time zone setting of the operating system 146. Once the geographical location is determined, the processor identifies the corresponding locale, and associates the currency key 206i with a default currency symbol corresponding to that locale. For example, if the geographical location is determined to be San Francisco, Calif., the processor 102 identifies the locale as the "United States" and associates the currency key 206i with the default dollar symbol—either "$" or "USD". Similarly, if the geographical location is determined to be London, UK, the processor 102 identifies the locale as the United Kingdom and associates the currency key 206i with the pound sterling sign, using either "£" or "GBP", whichever is the default.

In other example embodiments, the locale is determined by the processor 102 based on the context. For example, if the user is replying to a message that already contains one or more currency symbols of a specific type, the processor selects a locale that corresponds to the specific type of currency symbols. Thus, for example, if the user is replying to an email in which a product is offered for sale for a 100 USD, the processor determines the locale to be the United States.

In some embodiments, the locale is determined by a combination of factors. For example, if the GPS module 152 and the cellular connection are both unavailable, the locale may be determined by combining the information about the keyboard language with the time zone information. For instance, if the language is English and the time zone is "GMT+1", the processor 102 determines that the locale is United Kingdom. In some embodiments, the user selects which factors or combinations thereof should be used by the processor 102 in determining the locale.

In addition to dynamically associating the currency key 206i with an appropriate currency symbol, the processor 102 also assists the user by detecting and automatically formatting monetary expressions as they are entered or input by the user. Monetary expressions are textual expressions representing a monetary value, such as: "$100", "−100 USD", "1,234.00 € ". Monetary expressions typically include a currency symbol, a numerical value representing the amount, and special characters, such as a space, a comma, a period, etc. Formatting a monetary expression includes, for example, placing the currency symbol either before or after the numerical value, placing it either immediately adjacent to the numerical value or separated with a space, properly placing the minus sign in case of a negative amount, adding thousand separators and a decimal point where needed, and so forth.

Different locales require different formatting rules the monetary expressions. Even if two locales use the same currency, their formatting standards may differ. For example, in Netherlands the euro symbol "€" is properly placed before and adjacent to the numerical value, while in Germany the same symbol is properly placed after the numerical value, and with a space between them.

Moreover, even within the same locale there may be a different rule for different currency symbols. For example, in the United States, the symbol "$" is properly placed before the numerical value and immediately adjacent thereto; on the other hand, the symbol "USD" is typically placed after the number and separated with a space. These and other examples are listed in Table 1 below.

TABLE 1

Examples of currency symbol placements

| Locale | Symbol | Before/After | Space | Example |
| --- | --- | --- | --- | --- |
| United States | $ | Before | No | $42 |
| United States | USD | After | Yes | 42 USD |
| Germany | EUR | Before | Yes | EUR 42 |
| Germany | € | After | Yes | 42 € |
| Netherlands | € | Before | No | €42 |
| Brazil | R$ | Before | No | R$42 |

Figure 3A:
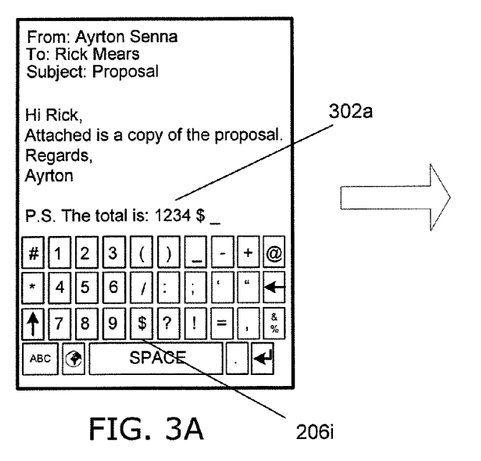
FIGS. 3A, 3B, 3C and 3D are screenshots of examples of a display having a virtual keyboard rendered thereupon in accordance with the present disclosure.
Figure 3B:
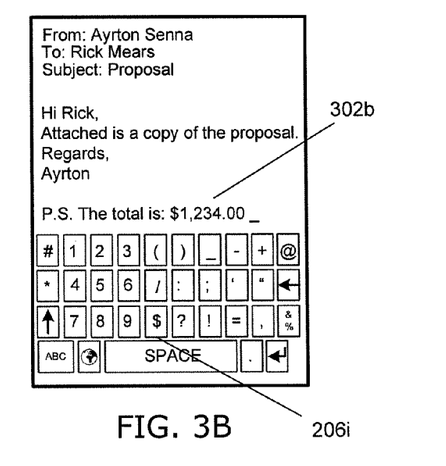

Examples of the automatic formatting by the processor 102 are illustrated in FIGS. 3A, 3B, 3C and 3D. In the example illustrated in FIGS. 3A and 3B, the portable electronic device 100 is physically located in New York, N.Y. In this example, the processor 102 uses the geographic location to determine the locale. Thus, the locale is determined to be the United States. Consequently, the processor 102 associates the currency key 206i with the default currency symbol for the United States (namely "$" in the presently described example embodiment) and displays the same upon the currency key 206i. The user is typing an email message, as illustrated in FIG. 3A. As soon as the user finishes typing the text "1234 $" (302a), the processor 102 recognizes the text as a monetary expression and automatically, in real time, reformats the text according to the format that corresponds to combination of the locale (United States) and the currency symbol ("$"). The result, as illustrated in FIG. 3B, is the reformatted text: "$1,234.00" (302b). This dynamic, real-time, formatting occurs instantaneously and in a way that is undisruptive to the user. The user may continue typing additional text, aware or unaware of the formatting that has occurred.

Figure 3C:
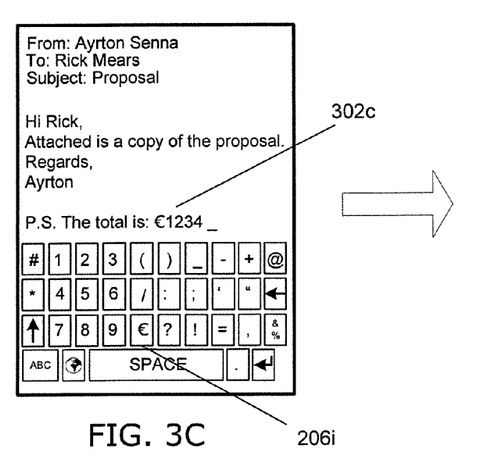
Figure 3D:
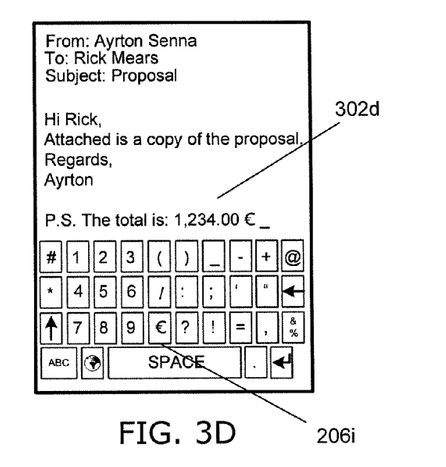

In the example illustrated in FIG. 3C and FIG. 3D, the portable electronic device 100 is physically located in Paris, France. In this example, the processor 102 again uses the geographic location method to determine the locale, and thus identifies the locale as France. Consequently, it associates the currency key 206i with the default currency symbol for France (e.g., "€") and displays the same upon the currency key 206i. The user is typing an email message, as illustrated in FIG. 3C. As soon as the user finishes typing the text "€ 1234" (302c), the processor 102 recognizes the text as a monetary expression and automatically, in real time, reformats the text according to the format that corresponds to the combination of the locale (France) and the currency symbol ("€"). The result, as illustrated in FIG. 3D, is the reformatted text: "1,234.00 €" (302d).

Figure 4:
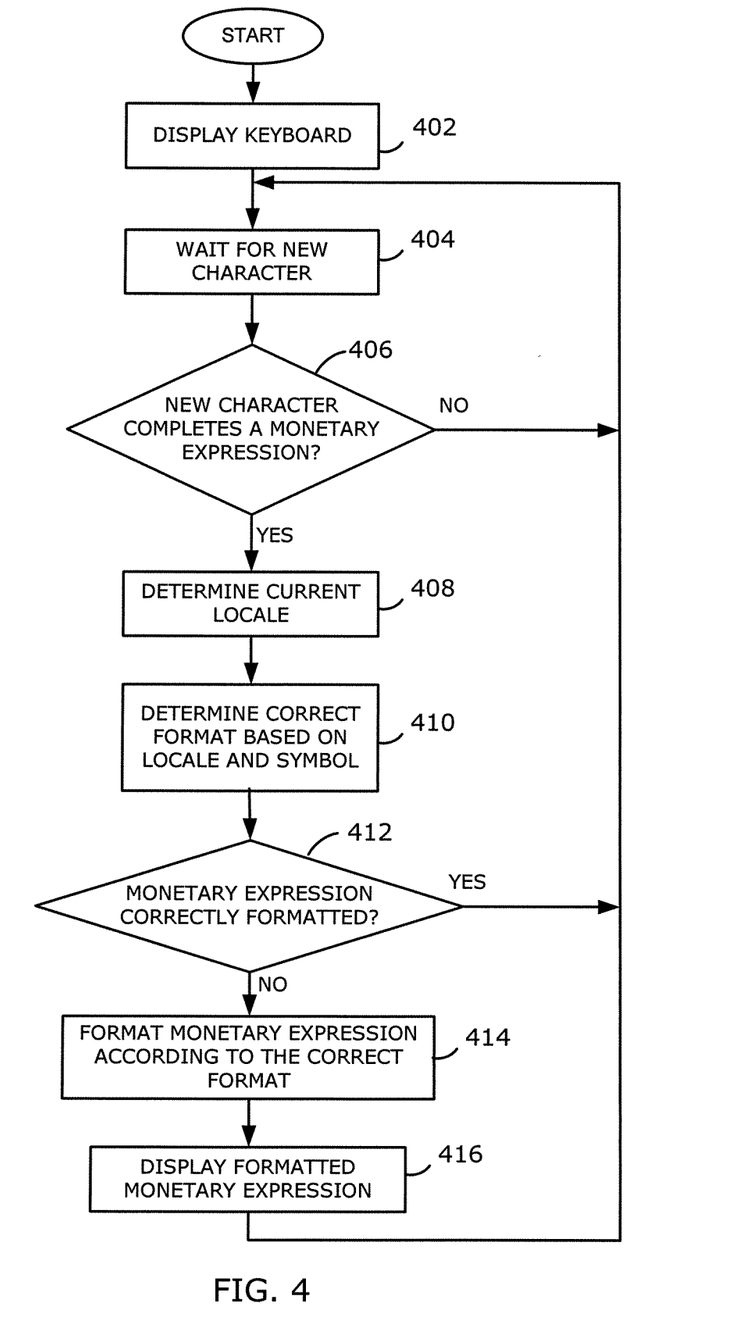
FIG. 4 is a flowchart illustrating a method for reformatting a monetary expression in accordance with the present disclosure.

A flowchart illustrating a method of automatically formatting monetary expressions at an electronic device is shown in FIG. 4. The method may be carried out by software executed, for example, by the processor 102. Coding of software for carrying out such a method is within the scope of a person of ordinary skill in the art given the present disclosure. The method may contain additional or fewer processes than shown and/or described, and may be performed in a different order. Computer-readable code executable by at least one processor of the portable electronic device to perform the method may be stored in a computer-readable medium, such as a non-transitory computer-readable medium. Alternatively, the method may be carried out in full or in part by special hardware internal or external to the processor 102.

The method is carried out in any suitable program or application in which characters, such as alphabetical, numerical, and symbolic characters, are input. Examples of suitable applications include email, text messaging, calendar, tasks, address book, map, Web browser, word processing, and so forth. Information from the application is displayed on the display 112 of the portable electronic device 100.

To input characters in a program or application being executed by the processor 102, a keyboard 204 having a plurality of keys 206 is displayed on the display 112 of the portable electronic device 100 at 402. The processor 102 then waits at 404 for a new character to be inputted by the user by selecting one of the keys 206. Once a new character is inputted, the processor 102 analyzes at 406 whether the input of the new character completes a monetary expression. Monetary expression is deemed completed when the processor 102 identifies, for example, that the new character is a delimiter character or delimiter function immediately following a currency symbol-number pair. The symbol-number pair is a currency symbol preceding or succeeding a numerical value, the two being immediately adjacent to each other or separated by one or more special characters from a predetermined list. The numerical value comprises, for example, characters representing digits (0-9), characters representing a decimal point (a period or a comma) or a thousand separator (a comma). The predetermined list of special characters includes, for example, a space character and a minus character. Delimiter includes, for example, a space, a return key 206d, or any of the punctuation characters. For example, the following expressions may be deemed as completed monetary expressions: "$123", "$ 1.23?", "123 USD!", "1,234,657 € ", "€ –123,".

Still referring to FIG. 4, if the processor 102 identifies at 406 that the new character completed a monetary expression, it proceeds to determine the current locale at 408; otherwise, it goes back and waits for another character at 404. At 408, the processor 102 determines the current locale using, for example, the keyboard language and/or the geographical location, as described above. Next, the processor 102 determines at 410 the correct format that corresponds for the current locale and the currency symbol from the monetary expression. The processor 102 may retrieve the correct format from a table that stores all possible locale/symbol combinations and their corresponding formats. The table may be stored, for example, in the memory 110. Alternatively, the processor 102 may retrieve that information from the network 150.

Next, the processor 102, optionally, determines at step 412 whether the monetary expression is already formatted according to the correct format determined at 410. If so, the processor 102 goes back to 404; otherwise, it proceeds to 414, where it formats the monetary expression according to the correct format determined at 410. The processor 102 then displays at 416 the formatted monetary expression on the touch-sensitive display 118 and returns to 404 to wait for new input.

In some embodiments, after the processor 102 formats the monetary expression and the formatted expression replaces the original expression on the touch-sensitive screen 118, the user can undo the replacement operation, for example, by pressing the backspace key 206a after the formatting has occurred. This may be desired if the user prefers his original monetary expression format to the new format. If after formatting the currency data at 414 and waiting at 404 for a new character, the first new character received by the processor 102 is a backspace key 206a, the processor may undo the formatting and revert the monetary expression to its original format. Additionally, the processor 102 may store the original format in the memory 110 so that it can avoid reformatting it in the future.

In some embodiments, the processor 102, instead of automatically formatting each monetary expression as soon as it is entered by the user, waits for the user to manually initiate the formatting of one or more monetary expressions within the input text. For example, the formatting may be initiated when the user presses a "Send" button to send the message, or invokes a spell-checking functionality.

In some embodiments, the user types a monetary expression using a currency symbol that corresponds to the device's locale, but is not the default currency symbol for that locale. For example, the processor 102 determines that the locale is the United States, and the default currency symbol (associated with and displayed upon the currency key 206i) is "$". The user may still enter a monetary expression with an alternative currency symbol, such as "100 USD", by using the alphabet letters "U", "S", and "D". In accordance with the presently described embodiment, the processor 102 will format the monetary expression according to the default currency symbol associated with the locale and will output "$100".

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method performed on a device having a display and a virtual keyboard comprising a first currency character displayed on a currency key, the method comprising:

based on a determination that the device is associated with a locale corresponding to a second currency character, altering the currency key to display the second currency character instead of the first currency character;

receiving an input comprising a monetary expression, wherein the monetary expression comprises the second currency character and a numerical value, wherein the second currency character precedes or succeeds the numerical value;

upon determining that the received input corresponds to the monetary expression, automatically formatting and displaying the received input according to a determined currency format in place of the received input.

2. The method of claim 1, wherein the currency format is determined based at least on the locale associated with the device.

3. The method of claim 2, wherein the locale associated with the device is determined based at least on a language associated with the keyboard.

4. The method of claim 2, wherein the locale associated with the device is determined based at least on a geographical location of the device.

5. The method of claim 4, wherein the geographical location is determined at least in part by a GPS module associated with the device.

6. The method of claim 2, further comprising:

receiving an additional input; and displaying the received input in place of the formatted input, if the additional input is associated with an undo operation.

7. The method of claim 1, further comprising:

determining whether received input is formatted according to the determined currency format.

8. The method of claim 1, further comprising:
   determining whether the second currency character is separated from the one or more numerical characters by a set of zero or more space characters; and
   determining whether the received input further includes a delimiter, wherein the delimiter immediately follows the last among the second currency character and the numerical value.

9. The method of claim 1, wherein the determined currency format defines at least:
   whether the second currency character should precede or succeed the numerical value; and
   the number of space characters between the second currency character and the numerical value.

10. A device, comprising:
    a virtual keyboard comprising a first currency character displayed on a currency key;
    a display; and
    a processor configured to:
       based on a determination that the device is associated with a locale corresponding to a second currency character, alter the currency key to display the second currency character instead of the first currency character;
       receive an input comprising a monetary expression, wherein the monetary expression comprises at least the second currency character and a numerical value, wherein the second currency character precedes or succeeds the numerical value;
       upon determining that the received input corresponds to the monetary expression, automatically format and display the received input according to a determined currency format in place of the received input.

11. The device of claim 10, wherein the currency format is determined based at least on the locale associated with the device.

12. The device of claim 11, wherein the locale associated with the device is determined based at least on a language associated with the keyboard.

13. The device of claim 11, wherein the locale associated with the device is determined based at least on a geographical location of the device.

14. The device of claim 13, wherein the geographical location is determined at least in part by a GPS module associated with the device.

15. The device of claim 11, wherein the processor is further configured to:
    receive an additional input; and
    display the received additional input in place of the formatted input, if the additional input is associated with an undo operation.

16. The device of claim 10, wherein the processor is further configured to:
    determine whether the received input is formatted according to the determined currency format.

17. The device of claim 10, wherein the processor is further configured to:
    determine whether the second currency character is separated from the numerical value by a set of zero or more space characters; and
    determine whether the received input further includes a delimiter, wherein the delimiter immediately follows the last among the second currency character and the numerical value.

18. The device of claim 10, wherein the determined currency format defines at least:
    whether the second currency character should precede or succeed the numerical value; and
    the number of space characters between the second currency character and the numerical value.

19. A non-transitory computer-readable medium storing computer-readable code executable by at least one electronic device having at least one processor and a virtual keyboard comprising a first currency character displayed on a currency key, to cause the electronic device to perform a method, the method comprising:
    based on a determination that the device is associated with a locale corresponding to a second currency character, altering the currency key to display the second currency character instead of the first currency character;
    receiving an input comprising a monetary expression, wherein the monetary expression comprises the second currency character and a numerical value, wherein the second currency character precedes or succeeds the numerical value;
    upon determining that the received input corresponds to the monetary expression, automatically formatting and displaying the received input according to a determined currency format in place of the received input.

20. The non-transitory computer-readable medium of claim 19, wherein the currency format is determined based at least on the locale associated with the device.

* * * * *